3,773,958
METHODS OF PRODUCING ANTI-ARTHRITIC ACTIVITY USING 3 - SUBSTITUTED - THIO - 2,4-THIAZOLIDINEDIONE
Charles E. Berkoff, Huntingdon Valley, Blaine M. Sutton, Hatboro, and Donald T. Walz, Drexel Hill, Pa., assignors to Smithkline Corporation, Philadelphia, Pa.
No Drawing. Filed Sept. 17, 1971, Ser. No. 181,573
Int. Cl. A61k 27/00
U.S. Cl. 424—270                    4 Claims

ABSTRACT OF THE DISCLOSURE

Pharmaceutical compositions having anti-arthritic activity which comprise a 3-substituted-2-thio-2,4-thiazolidinedione and methods of producing anti-arthritic activity by administering internally said compositions.

---

This invention relates to novel pharmaceutical compositions having anti-arthritic activity and to methods of producing anti-arthritic activity by administering said compositions. More specifically, the compositions of this invention comprise a 3-substituted-2-thio-2,4-thiazolidinedione as the active medicament.

The novel pharmaceutical compositions of this invention, in dosage unit form, comprise a nontoxic pharmaceutical carrier and a 3-substituted-2-thio-2,4-thiazolidinedione of the following general structural formula:

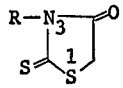

FORMULA I wherein R represents ethyl or substituted phenyl, such as monohalophenyl for example monochloro, monobromo or monofluorophenyl, preferably monochlorophenyl and in the 4'-position of the phenyl group, dichlorophenyl, for example 2,6-dichlorophenyl or 3,4-dichlorophenyl, or alkylphenyl, for example tolyl.

The compounds of Formula I above are either known or are prepared by one of the following synthetic methods. Starting with an isothiocyanate, a compound of the formula R—N=C=S is condensed with an excess of mercaptoacetic acid in the presence of triethylamine, by heating in a pressure bottle at 100–140° C. for from one to four hours to give the desired 3-R-substituted-2-thio-2,4-thiazolidinedione. The required isothiocyanates are prepared, for example, by the reaction of an appropriate amine (RNH₂) with thiophosgene (CSCl₂). Starting with a dithiocarbamate, a compound of the formula

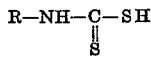

preferably as a triethylamine salt, is condensed with chloroacetic acid (or ester) followed by treatment with mineral acid to give the thiazolidinedione product.

The anti-arthritic activity of the compositions of this invention is measured by the ability of the active medicament to inhibit adjuvant-induced polyarthritis in rats. The active medicaments of Formula I produce marked inhibition of the development of adjuvant arthritis in rats at daily oral doses of from 25 mg. to 50 mg. per kilogram of body weight. Adjuvant arthritis in rats is produced by a single injection of 0.75 mg. of *Mycobacterium butyricum* suspended in white paraffin (N.F.) into a hindpaw (left footpad). The injected leg becomes inflamed and reaches a maximum volume in 3–5 days (primary lesion). The animals exhibit a decrease in body weight gain during this initial period. Adjuvant arthritis (secondary phase) occurs after a delay of approximately 10 days and is characterized by inflammation of the non-injected sites (right hind leg), decrease in body weight gain and further increases in the volume of the injected hind leg. The compounds of Formula I administered in the doses described above beginning on the day of adjuvant injection and continuing for 17 days, thereafter, exclusive of days 4, 5, 11 and 12 protect the animals against development of both primary and secondary lesions of adjuvant arthritis.

The utility of the compositions of this invention is further enhanced by the failure of the compounds of Formula I to produce gastric erosions in rats at doses up to 200 mg./kg. as demonstrated in standard pharmacological test procedures.

The pharmaceutical compositions of this invention are prepared in conventional dosage unit forms by incorporating an amount of a compound of Formula I sufficient to produce anti-arthritic activity with a nontoxic pharmaceutical carrier according to accepted procedures. Preferably the compositions will contain a 2-thio-2,4-thiazolidinedione of Formula I in an amount of from about 25 mg. to about 150 mg. per dosage unit.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Similarly the carrier or diluent can include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form or in the form of a troche or lozenge. The amount of solid carrier will vary widely but preferably will be from about 25 mg. to about 1 g. If a liquid carrier is used, the preparation will be in the form of a syrup, emulsion, soft gelatin capsule, sterile injectable liquid such as an ampule or an aqueous or nonaqueous liquid suspension.

The pharmaceutical dosage unit forms described hereinabove exclude simple non-sterile solutions of the active medicament in water or in common organic solvents and exclude simple aqueous suspensions of the active medicament in the absence of a suspending agent.

The method in accordance with this invention comprises administering internally to an animal organism a 2-thio-2,4-thiazolidinedione of Formula I above, usually combined with a pharmaceutical carrier, in an amount sufficient to produce anti-arthritic activity. The active medicament will be administered in a dosage unit, preferably in an amount of from about 25 mg. to about 150 mg. The route of administration may be orally or parenterally, the oral route being preferred. Advantageously equal oral doses will be administered three times daily with the daily dosage regimen being from about 75 mg. to about 450 mg. When the method described above is carried out anti-arthritic activity is produced with a minimum of size effects.

The pharmaceutical preparations are made following the conventional techniques of the pharmaceutical chemist involving mixing, granulating and compressing when necessary, or variously mixing and dissolving the ingredients as appropriate to the desired end product.

The following examples illustrate the preparation of compounds of Formula I and their incorporation into pharmaceutical compositions of this invention, and as such are not to be considered as limiting the invention set forth in the claims appended hereto.

EXAMPLE 1

A mixture of 27 g. (0.16 m.) of p-chlorophenyl isothiocyanate, 33 ml. (42.5 g., 0.475 m.) of mercaptoacetic acid and 5 drops of triethylamine is heated in a pressure bottle at 120–130° C. for two and one-half hours. The reaction mixture is allowed to stand at room temperature overnight and filtered. The crude product is recrystallized from ethanol to give 3-(4'-chlorophenyl)-2-thio-2,4-thiazolidinedione, M.P. 124.5–126° C.

EXAMPLE 2

As described in Example 1, a mixture of 6.12 g. (0.04 m.) of p-fluorophenyl isothiocyanate, 4.15 ml. (5.5 g., 0.06 m.) of mercaptoacetic acid and 5 drops of triethylamine is heated in a pressure bottle at 110–130° C. for 3 hours to yield after cooling and filtration the product, 3 - (4' - fluorophenyl) - 2-thio-2,4-thiazolidinedione, M.P. 155–158° C.

EXAMPLE 3

To a solution of 4.73 g. (0.05 m.) of chloroacetic acid in 40 ml. of water is added a solution of 2.7 g. (0.025 m.) of sodium carbonate in 20 ml. of water. The solution is cooled in an ice bath and 14.2 g. (0.05 m.) of the triethylamine salt of p-tolyl dithiocarbamic acid is added portionwise over five minutes. The resulting mixture is stirred at room temperature for one and one-half hours. Water is added to bring total volume to 150 ml. and the resulting mixture is warmed on the steam bath for five minutes, then filtered. The filtrate is acidified with 40 ml. of 6 N hydrochloric acid, heated to 95° C., cooled, filtered and the solid washed with water to leave 3-(4'-tolyl)-2-thio-2,4-thiazolidinedione, M.P. 164–165° C.

EXAMPLE 4

A mixture of 6.12 g. (0.03 m.) of 3,4-dichlorophenyl isothiocyanate, 2.8 ml. (3.68 g., 0.04 m.) of mercaptoacetic acid and a few drops of triethylamine is heated in a pressure bottle at 110–130° C. for two hours. The cooled reaction mixture is filtered to give 3-(3',4'-dichlorophenyl)-2-thio-2,4-thiazolidinedione, M.P. 176–178° C.

Similarly, employing 2,6-dichlorophenyl isothiocyanate as described above yields the corresponding 3-(2',6'-dichlorophenyl)-2-thio-2,4-thiazolidinedione, M.P. 166–168° C.

EXAMPLE 5

Ingredients: Mg./tablet
3-(4'-chlorophenyl)-2-thio-2,4-thiazolidinedione _____ 25
Calcium sulfate, dihydrate _____ 150
Sucrose _____ 25
Starch _____ 15
Talc _____ 5
Stearic acid _____ 3

The sucrose, calcium sulfate and 3-(4'-chlorophenyl)-2-thio-2,4-thiazolidinedione are thoroughly mixed and granulated with hot 10% gelatin solution. The wetted mass is passed through a #6 mesh screen directly onto drying trays. The granules are dried at 120° F. and passed through a #20 mesh screen, mixed with the starch, talc and stearic acid, and compressed into tablets.

EXAMPLE 6

Ingredients: Mg./capsule
3-(4'-chlorophenyl)-2-thio-2,4-thiazolidinedione _____ 150
Magnesium stearate _____ 5
Lactose _____ 300

The above ingredients are screened through a #40 mesh screen, mixed and filled into #0 hard gelatin capsules.

What is claimed is:

1. The method of producing anti-arthritic activity which comprises administering internally to an animal suffering from arthritis in an amount sufficient to produce said activity a 2-thio-2,4-thiazolidinedione of the formula:

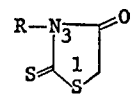

in which R is ethyl, monochlorophenyl, monobromophenyl, monofluorophenyl, dichlorophenyl or tolyl.

2. The method according to claim 1 in which R is monochlorophenyl.

3. The method according to claim 2 in which R is 4'-chlorophenyl.

4. The method according to claim 3 in which the active medicament is administered orally in a daily dosage regimen of from about 75 mg. to about 450 mg.

References Cited
FOREIGN PATENTS

| | | | |
|---|---|---|---|
| 166,701 | 4/1964 | U.S.S.R. | 260—306.7 |
| 6,609,992 | 1/1967 | Netherlands. | |
| 1,078,086 | 8/1967 | Great Britain. | |
| 265,254 | 10/1968 | Austria. | |

OTHER REFERENCES

Zapadnyuk: Chem. Abst., vol. 66 (1967), p. 9640m.
Dybaw et al.: Chem. Abst., vol. 59 (1963), p. 15812.
Werbel et al.: J. Med. Chem. (1968), 11 (2), pp. 364–5.
Zapadnyuk: Chem. Abst., vol. 57 (1962), p. 2341.
Garraway: J. Chem. Soc., 1961, pp. 3733–5.

ALBERT T. MEYERS, Primary Examiner

A. J. ROBINSON, Assistant Examiner